(12) United States Patent
Ikeda

(10) Patent No.: US 7,998,607 B2
(45) Date of Patent: Aug. 16, 2011

(54) PARTIALLY-OXIDIZED CAP LAYER FOR HARD DISK DRIVE MAGNETIC MEDIA

(75) Inventor: Yoshihiro Ikeda, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 21 days.

(21) Appl. No.: 12/533,654

(22) Filed: Jul. 31, 2009

(65) Prior Publication Data

US 2011/0026161 A1    Feb. 3, 2011

(51) Int. Cl.
*G11B 5/66* (2006.01)
(52) U.S. Cl. ............ 428/836.2; 427/130; 427/131
(58) Field of Classification Search .................. None
See application file for complete search history.

(56) References Cited

U.S. PATENT DOCUMENTS

| | | | |
|---|---|---|---|
| 6,641,901 | B2 | 11/2003 | Yoshida et al. |
| 6,773,826 | B2 | 8/2004 | Nakagawa et al. |
| 7,166,375 | B2 | 1/2007 | Shimizu et al. |
| 7,354,618 | B2 | 4/2008 | Chang et al. |
| 2003/0017370 | A1 | 1/2003 | Shimizu et al. |
| 2006/0090998 | A1 | 5/2006 | Honda et al. |
| 2006/0286413 | A1 | 12/2006 | Liu et al. |
| 2007/0248843 | A1 | 10/2007 | Wu et al. |
| 2007/0292721 | A1 | 12/2007 | Berger et al. |
| 2008/0070065 | A1 | 3/2008 | Berger et al. |
| 2008/0096053 | A1 | 4/2008 | Bian et al. |
| 2008/0138662 | A1 | 6/2008 | Berger et al. |
| 2009/0086372 | A1 * | 4/2009 | Ichihara et al. ............... 360/135 |

FOREIGN PATENT DOCUMENTS

| JP | 7320257 A | 12/1995 |
|---|---|---|
| WO | 2006046732 A1 | 5/2006 |

* cited by examiner

*Primary Examiner* — Holly Rickman

(57) ABSTRACT

A perpendicular recording magnetic media with a partially-oxidized cap layer combines a second oxide layer with a first cap layer to form the singular, partially-oxidized cap. The oxidized portion and the non-oxidized portion of the partially-oxidized layer are sputtered from a same target and have a same composition of metallic elements. The Ms of the oxidized portion is about twice as high as the non-oxidized portion. The oxidized portion has a thickness in the range of about 5 to 25 angstroms. The layer composition may comprise CoPtCrBTa, with a Cr at % of about 18-24%, Pt at about 13-20%, B at about 4-10%, and Ta at about 0-2%.

28 Claims, 5 Drawing Sheets

US 7,998,607 B2

PARTIALLY-OXIDIZED CAP LAYER FOR HARD DISK DRIVE MAGNETIC MEDIA

BACKGROUND OF THE INVENTION

1. Technical Field

The present invention relates in general to hard disk drives and, in particular, to an improved system, method and apparatus for a perpendicular recording magnetic media with a partially-oxidized cap layer for hard disk drives.

2. Description of the Related Art

Perpendicular recording in magnetic media is now a standard technology for the hard disk drive industry. Perpendicular recording provides increased areal density compared to previous technologies, such as longitudinal or patterned media. When areal density is increased, however, the media structure becomes more complicated with many additional layers. In general, greater numbers of layers require newer and more expensive fabrication tools, which yield a higher fabrication cost for the media.

Since cost reduction is a very high priority in media manufacturing, the utilization of older fabrication tools with fewer layer fabrication chambers for complicated media structures is an effective way to reduce cost. Dual cap structures in the media require additional process chambers to realize this advantage. It is also known that multiple oxide layers in the media can achieve high signal-to-noise reduction (SNR) as well as good thermal stability in the same time. An improved system, method and apparatus for more effectively and efficiently fabricating the layers of magnetic media for hard disk drives would be desirable.

SUMMARY OF THE INVENTION

Embodiments of a system, method, and apparatus for hard disk drive magnetic media with a partially-oxidized cap layer are disclosed. The media combines a second oxide layer with a first cap layer to form a singular, partially-oxidized cap. This design reduces the number of process chambers required to fabricate the media without sacrificing the performance of the media. The invention is well suited for perpendicular magnetic recording media, and also suitable for longitudinal or patterned media.

At the partially-oxidized cap station, the inert gas and oxygen mixture flow initially to grow the bottom oxide portion. The oxygen flow is then stopped in the gas in the middle of the film growth. By continuing the media deposition, the layer is completed as a non-oxidized cap layer. The material selection for the partially-oxidized layer may comprise a Cr alloy, such as CoPtCrBTa, with a Cr at % of about 18-24%, Pt at about 13-20%, B at about 4-10%, and Ta at about 0-2%. In other embodiments, the material comprises Cr at about 19-21%, Pt at about 17-20%, B at about 6-8%, and Ta 0-1%. The saturation magnetization (Ms) value of the layer portion sputtered without oxygen comprises less than about 300 emu/cc to achieve this benefit. The Ms value increases to about 400-500 emu/cc in the non-oxidized portion. In some embodiments, the oxidized portion of the cap layer is about 0.5-2.5 nm thick, and the non-oxidized cap thickness is about 0.5-5 nm. In still other embodiments, the oxide portion is about 1-2 nm thick, and the non-oxidized cap portion is about 3-4 nm thick.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention are attained and can be understood in more detail, a more particular description of the invention briefly summarized above may be had by reference to the embodiments thereof that are illustrated in the appended drawings. However, the drawings illustrate only some embodiments of the invention and therefore are not to be considered limiting of its scope as the invention may admit to other equally effective embodiments.

DETAILED DESCRIPTION OF THE INVENTION

FIGS. 1-8 depict embodiments of a system, method and apparatus for hard disk drive magnetic media (e.g., perpendicular magnetic recording media, or PMR) with a partially-oxidized cap layer. For example, a perpendicular media may be provided with a partially-oxidized layer between a non-oxidized cap layer and a fully-oxidized bottom layer.

Figure 1:
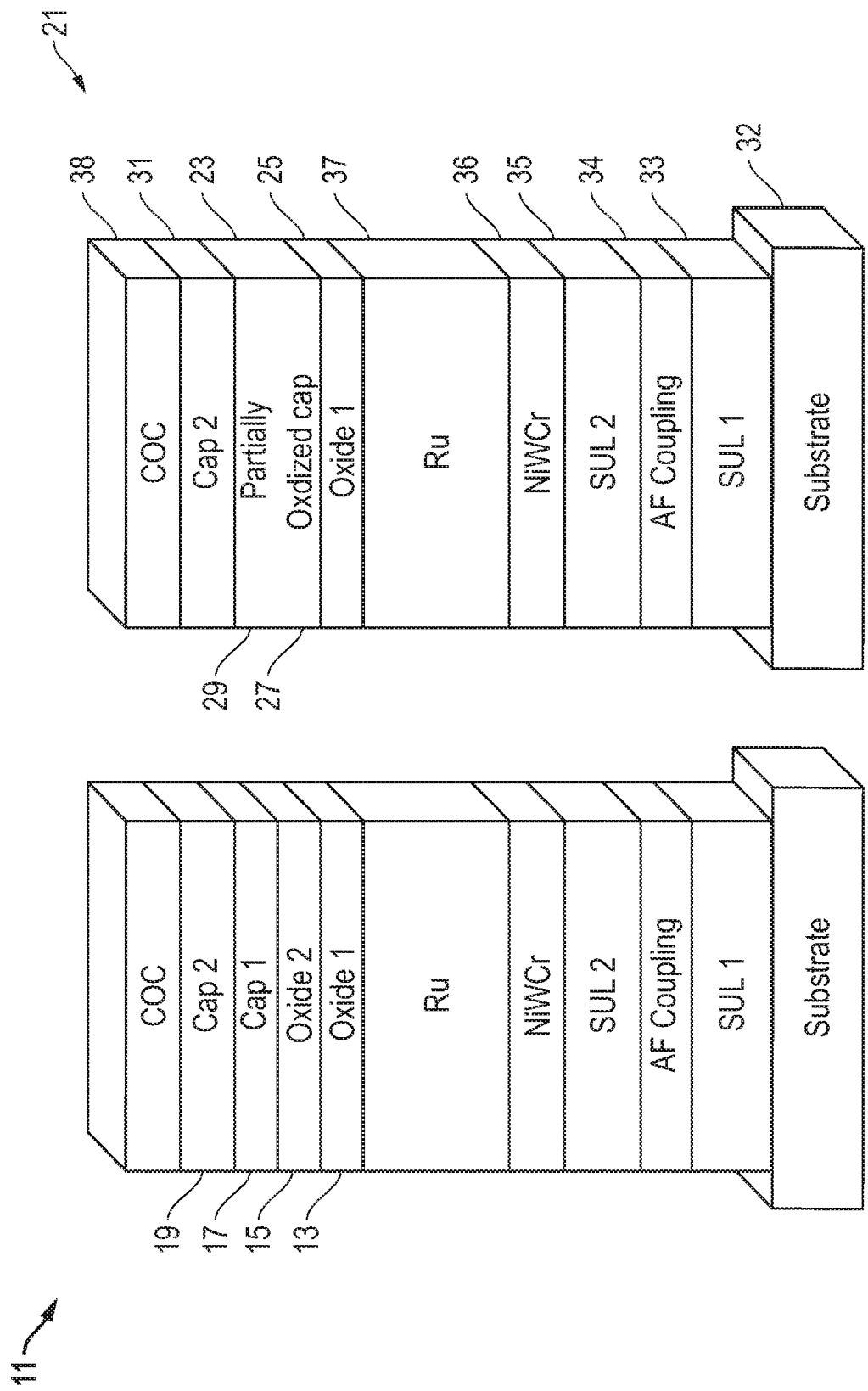
FIG. 1 is a schematic drawing of, on the left, one type of conventional magnetic media and, on the right, an embodiment of a magnetic media constructed in accordance with the invention.

FIG. 1 shows schematic images of, on the left, one type of conventional magnetic media 11 and, on the right, an embodiment of a magnetic media 21 constructed in accordance with the invention. Media 11 has two different types of oxide layers 13, 15 as well as two different types of cap layers 17, 19. That structure requires fabrication with a total four process chambers. In contrast, media 21 has a combined oxide and cap apportioned layer that is fabricated as a partially-oxidized cap layer 23. Fabrication of layer 23 reduces the number of process chambers required by one over prior art methods, without sacrificing the media performance.

For example, in one embodiment media 21 may be fabricated by a method comprising conventional media deposition up to the first oxide layer 25. At the partially-oxidized cap layer station, a gas mixture (e.g., argon and oxygen) initially flows to grow the bottom oxided portion 27. The oxygen flow is then terminated in the gas mixture near a middle of the film growth of layer 23. By continuing the media deposition, the layer 23 also is formed with a non-oxidized portion 29.

In some embodiments, the materials selected for the partially-oxidized cap layer 23 comprise a Cr concentration. For example, CoPtCrBTa may be used, with a Cr at % around 18-24 at %, Pt around 13-20 at %, B around 4-10 at %, and Ta around 0-2 at %. In still other embodiments, the layer comprises Cr 19-21 at %, Pt 17-20 at %, B 6-8 at %, and Ta 0-1 at %. The Ms value of the portion 29 sputtered without oxygen is less than 300 emu/cc to get this benefit. The Ms value increases up to 400-500 emu/cc once the layer 23 is oxidized.

In some embodiments, the oxidized portion 27 of the layer 23 may have a thickness of about 0.5-2.5 nm, and the non-oxidized cap portion 29 has a thickness of about 0.5-5 nm. In other embodiments, oxide portion 27 has a thickness of about 1-2 nm, and the non-oxidized cap portion 29 has a thickness of about 3-4 nm.

In one application example, the material for the partially-oxidized cap layer 23 comprises $CoPt_{18}Cr_{20}B_6$. The Ms value of the material sputtered without oxygen is about 250 emu/cc, but once it is oxidized, it goes up to about 450 emu/cc. This because oxygen enhances the Cr segregation and makes high Co-concentrated grains. The oxide portion thickness may be 1.5 nm, and the non-oxide portion thickness may be 4.5 nm, with an optional second cap layer 31 having a thickness of about 1 nm and formed from $CoPt_{18}Cr_{13}B_7$. The method may comprise turning off the oxygen (e.g., 5%)+Ar mixture gas flow in the with 40 sccm Ar gas for this non-oxidized layer 31.

Figure 2:
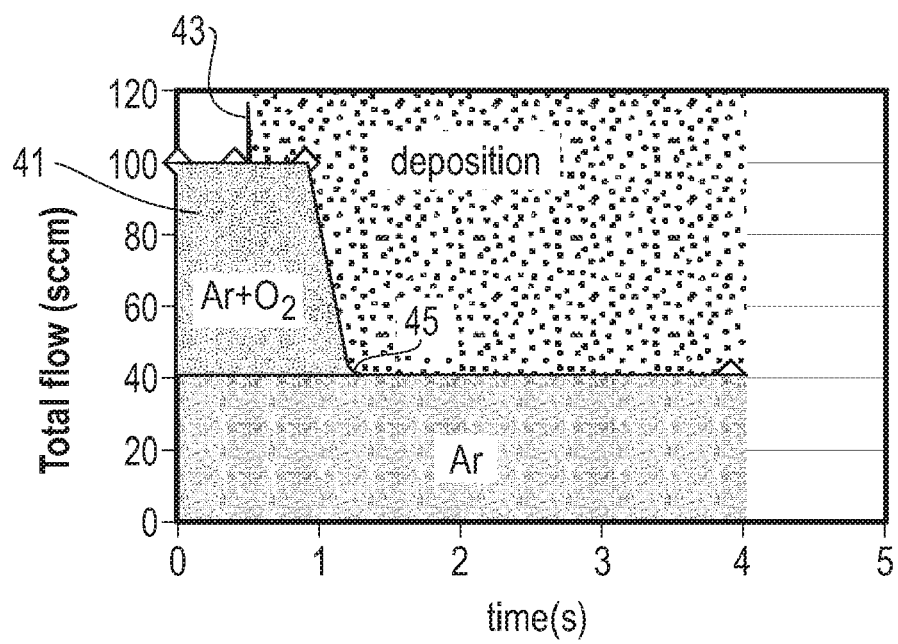
FIG. 2 is a plot of gaseous composition and flow over time for a method in accordance with the invention.

Referring now to FIG. 2, the partially oxidized cap deposition may initially comprise flowing $Ar+O_2$ mixture gas 41 with no sputtering. By doing this, oxygen is uniformly distributed in the chamber and grows better anisotropy in the initial oxide layer 25. After half second delay, the deposition 43 is started. After another half second, the $Ar+O_2$ gas flow is terminated 45. The chamber oxygen amount rapidly decreases and total gas pressure also decreases. This design promotes smooth and a well exchange-coupled cap layer for the reset of the process.

Figure 3:
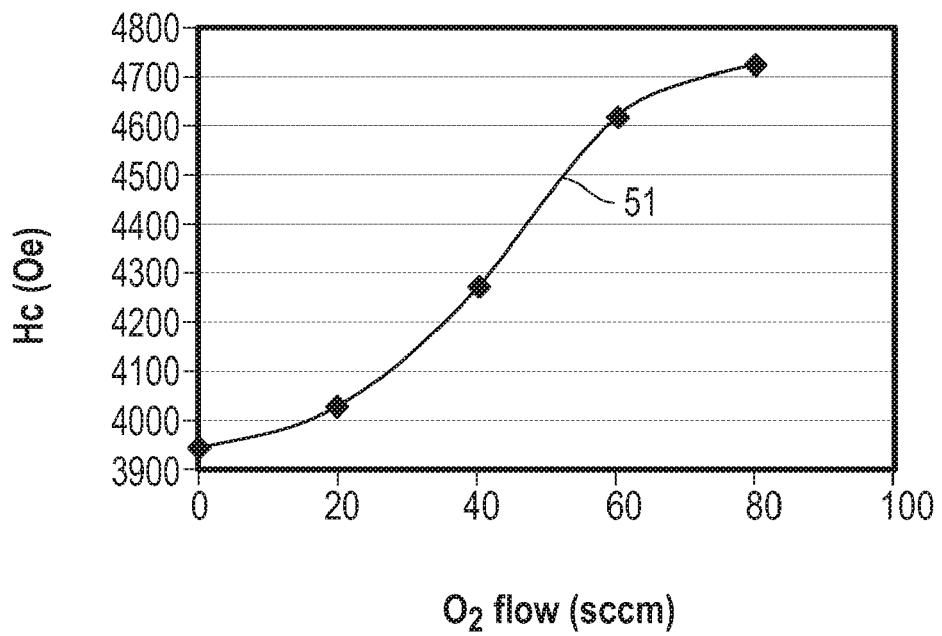
FIG. 3 is a plot showing the relationship between magnetic characteristics in magnetic media and gas flow during fabrication thereof.

FIG. 3 depicts a plot 51 of the coercivity (Hc) dependence of the oxygen 5% mixed Ar flow amount that partially oxidizes the cap. Coercivity is the required external field to demagnetize the magnetic material. Zero flow means no oxidization at the cap portion meaning a conventional cap structure. The Hc increases with an increase of the oxygen flow. This indicates the oxidized cap improves the grain separation and anisotropy energy, Ku.

Figure 4:
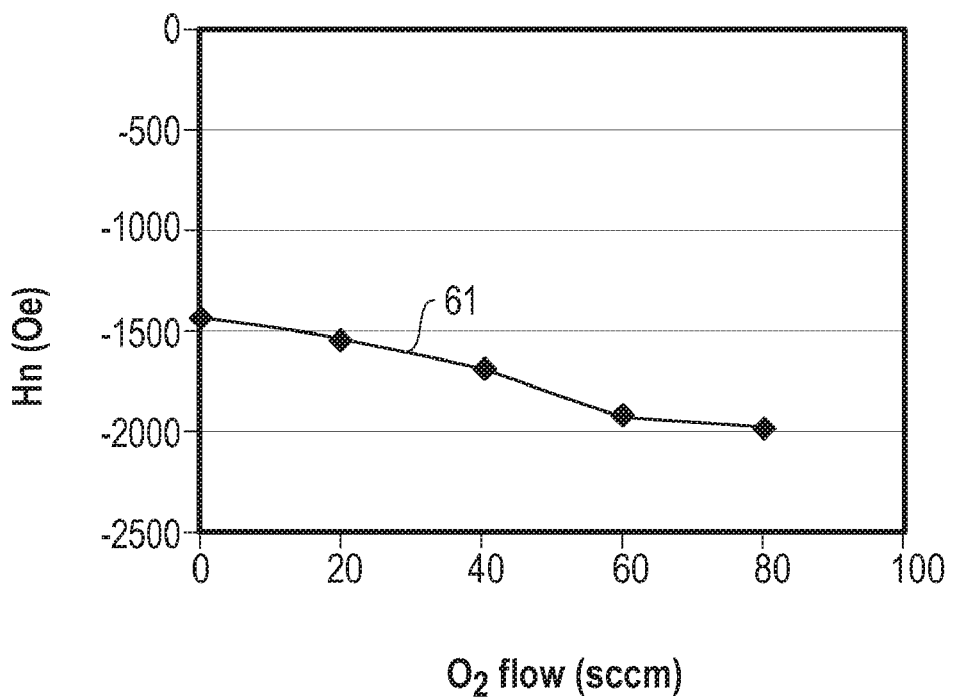
FIG. 4 is a plot showing the relationship between other magnetic characteristics in magnetic media and gas flow during fabrication thereof.
Figure 5:
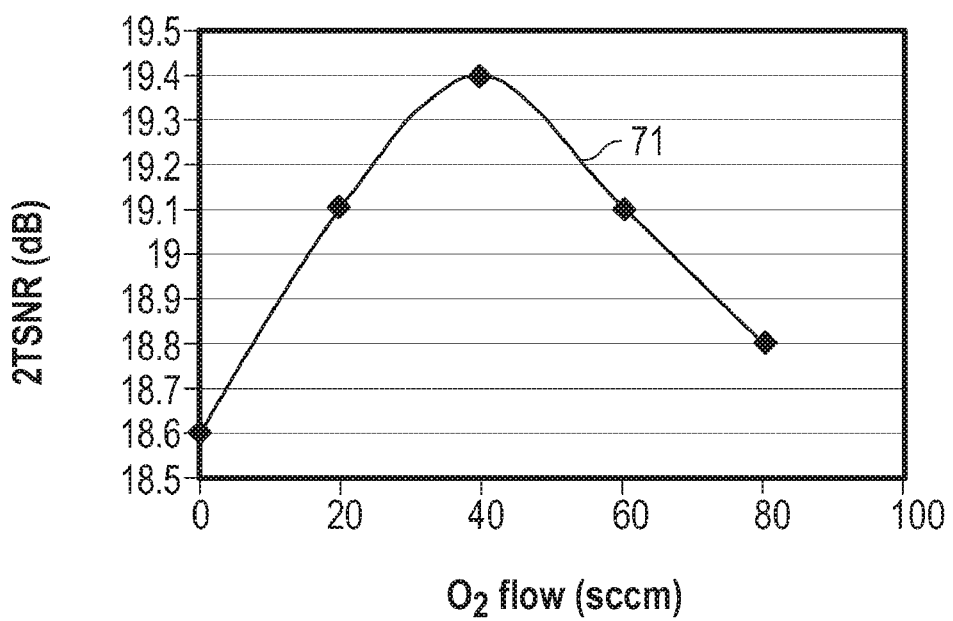
FIG. 5 is a plot showing the relationship between signal-to-noise ratio in magnetic media and gas flow during fabrication thereof.

FIG. 4 depicts a plot 61 of the nucleation field (Hn) value dependence of oxygen flow. Nucleation field is the required external field to reduce the magnetization down to 90% of the saturation magnetization (Ms). The Hn value increases with higher oxygen flow. It also helps to obtain better thermal stability. FIG. 5 depicts a plot 71 of signal-to-noise (SNR) dependence of the oxygen flow. It shows significant improvement from zero oxidization to 40 sccm by 0.8 dB, and then it shows the maximum value. It indicates there is optimum oxygen flow for each cap material.

Figure 6:
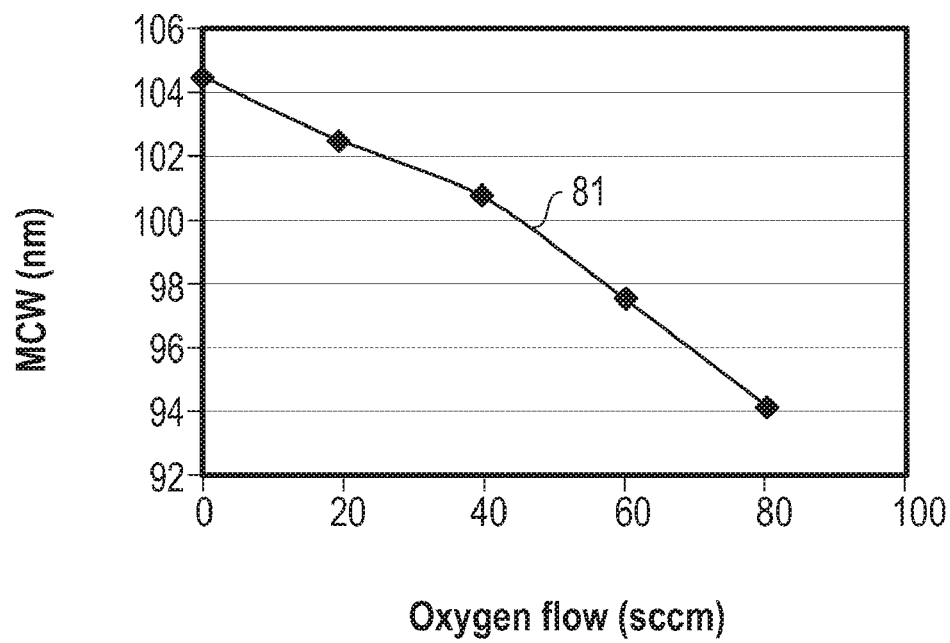
FIG. 6 is a plot showing the relationship between magnetic core width in magnetic media and gas flow during fabrication thereof.
Figure 7:
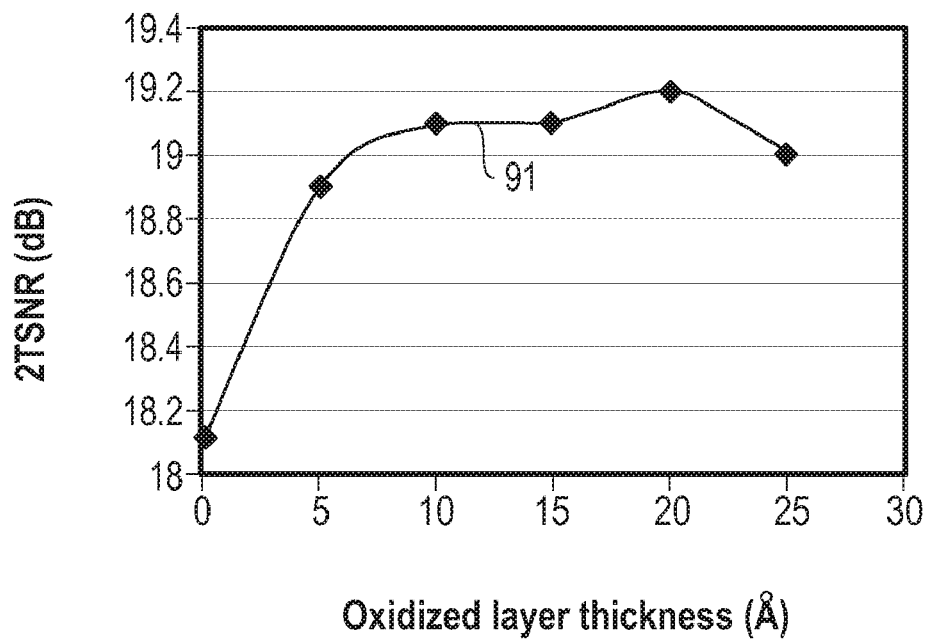
FIG. 7 is a plot showing the relationship between signal-to-noise ratio in magnetic media and oxidized layer thickness.

FIG. 6 depicts a plot 81 of the magnetic core width (MCW) dependence of oxygen flow. The MCW goes down with an increase in the oxygen flow. By changing the oxidized portion, the MCW is controlled. FIG. 7 depicts a plot 91 of oxidized layer thickness dependence on SNR. In this example, the total oxide layer thickness was kept constant at 110 angstroms. This design shows clear improvement from zero to 10 angstroms, and shows the plateau region up to about 20 before it goes down. This plot 91 indicates there is a preferable thickness in the range of about 10-20 angstroms.

In still other embodiments of the invention, the magnetic media for a hard disk drive comprises a substrate 32 having a plurality of layers of material formed thereon, comprising a soft underlayer (SUL) 33, an antiferromagnetic (AF) coupling layer 34, a second SUL 35, a template layer 36 (e.g., NiWCr, for better orientation of EBL growth) for the EBL, an exchange break layer (EBL) or intermediate layer 37 (e.g., Ru; also, together the template and EBL layers 36, 37 are sometimes collectively referred to as exchange break layers), and one or more oxide layers 25. The partially-oxidized cap layer 23 is on the oxide layer 25 and comprises the lower oxidized portion 27 integrated with the upper non-oxidized cap portion 29 to form a singular, partially-oxidized cap layer 23. In some embodiments, the second cap layer 31 is on the partially-oxidized cap layer 23, and a carbon overcoat (COC) 38 is on the second cap layer 31.

In some embodiments, the partially-oxidized cap layer 23 comprises a Cr alloy, such as CoPtCrBTa. The non-oxidized cap portion 29 of the partially-oxidized cap layer 23 may be sputtered without oxygen and has an Ms value of less than about 300 emu/cc, and the Ms value increases to about 400-500 emu/cc for the oxidized portion. Thus, there is a difference in the Ms values between the oxidized portion and the non-oxidized cap portion. Their thicknesses do not change after the process. The oxidized portion 27 may have an Ms that is about 1.5-2 times greater than that of the non-oxidized cap portion.

For some applications, the oxidized portion of the partially-oxidized cap layer has a thickness of about 0.5-2.5 nm thick, and the non-oxidized cap portion of the partially-oxidized cap layer has a thickness of about 0.5-5 nm. In other embodiments, the oxidized portion has a thickness of about 1-2 nm thick, and the non-oxidized cap portion has a thickness of about 3-4 nm. The oxidized and non-oxidized cap portions of the partially-oxidized cap layer may be sputtered from a same target and have a same composition of metallic elements. The partially-oxidized cap layer may comprise $CoPt_{18}Cr_{20}B_6$, the non-oxidized cap portion may have an Ms value of about 250 emu/cc and, after the non-oxidized cap portion is oxidized, the Ms value is about 450 emu/cc. The second cap layer 31 may have a thickness of about 1 nm and the partially-oxidized cap layer may be formed from $CoPt_{18}Cr_{13}B_7$.

In some embodiments of a method of fabricating magnetic media for a hard disk drive, the method comprises providing a substrate; forming a plurality of layers on the substrate as described herein up to the oxide layer 25 (FIG. 1); forming a partially-oxidized cap layer comprising an oxidized portion integrated with a non-oxidized cap portion to form a singular, partially-oxidized cap; forming a second cap layer on the partially-oxidized cap layer; and forming a carbon overcoat (COC) on the second cap layer.

In other embodiments, the partially-oxidized cap layer is formed by flowing a mixture of argon and oxygen (e.g., 5%) without sputtering to uniformly distribute oxygen and form the oxidized portion; after a delay (e.g., a half-second), starting deposition; after another delay (e.g., another half-second), terminating the flow of oxygen to complete the non-oxidized cap portion. This layer also may be formed by initially flowing inert gas and oxygen to grow the oxidized portion, stopping oxygen flow in a middle of film growth of the partially-oxidized cap layer, and continuing media deposition to complete the non-oxidized cap potion. In addition, the second cap layer may be formed at a thickness of about 1 nm with $CoPt_{18}Cr_{13}B_7$, and 40 sccm of argon gas.

Figure 8:
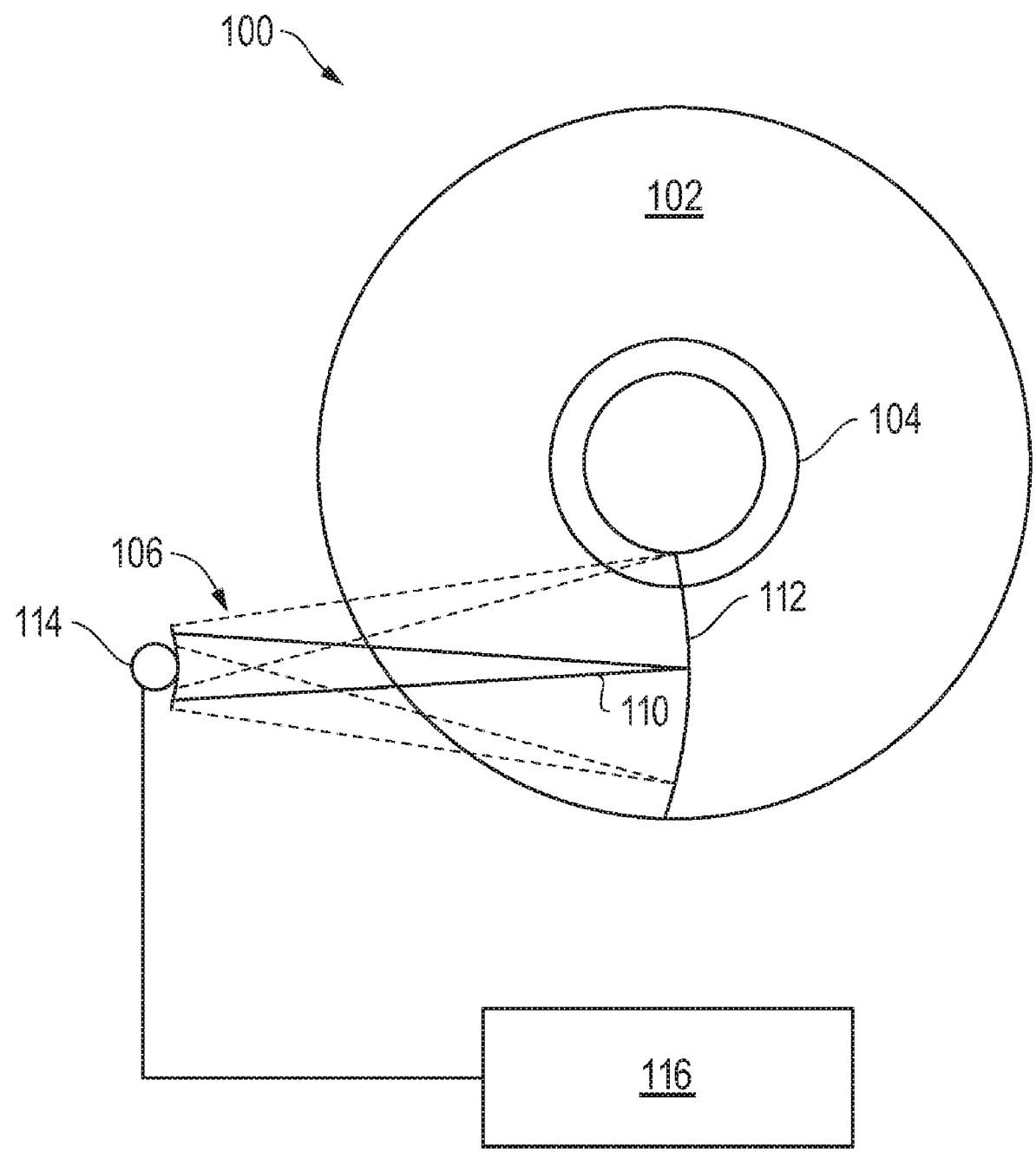
FIG. 8 is a schematic diagram of a hard disk drive constructed in accordance with the invention.

Referring to FIG. 8, a schematic diagram of a hard disk drive assembly 100 constructed in accordance with the invention is shown. A hard disk drive assembly 100 generally comprises one or more hard disks comprising a perpendicular magnetic recording media 102, rotated at high speeds by a spindle motor (not shown) during operation. The magnetic recording media 102 will be more fully described herein. Concentric data tracks 104 formed on either or both disk surfaces receive and store magnetic information.

A read/write head 110 may be moved across the disk surface by an actuator assembly 106, allowing the head 110 to read or write magnetic data to a particular track 104. The actuator assembly 106 may pivot on a pivot 114. The actuator assembly 106 may form part of a closed loop feedback system, known as servo control, which dynamically positions the read/write head 110 to compensate for thermal expansion of the perpendicular magnetic recording media 102 as well as vibrations and other disturbances. Also involved in the servo control system is a complex computational algorithm executed by a microprocessor, digital signal processor, or analog signal processor 116 that receives data address information from an associated computer, converts it to a location on the perpendicular magnetic recording media 102, and moves the read/write head 110 accordingly.

Specifically, read/write heads 110 periodically reference servo patterns recorded on the disk to ensure accurate head 110 positioning. Servo patterns may be used to ensure a read/write head 110 follows a particular track accurately, and to control and monitor transition of the head 110 from one track 104 to another. Upon referencing a servo pattern, the read/write head 110 obtains head position information that enables the control circuitry 116 to subsequently realign the head 110 to correct any detected error.

Servo patterns may be contained in engineered servo sectors 112 embedded within a plurality of data tracks 104 to allow frequent sampling of the servo patterns for optimum disk drive performance. In a typical perpendicular magnetic recording media 102, embedded servo sectors 112 extend substantially radially from the perpendicular magnetic recording media 102 center, like spokes from the center of a wheel. Unlike spokes however, servo sectors 112 form a subtle, arc-shaped path calibrated to substantially match the range of motion of the read/write head 110.

This written description uses examples to disclose the invention, including the best mode, and also to enable those of ordinary skill in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. While the invention has been shown or described in only some of its forms, it should be apparent to those skilled in the art that it is not so limited, but is susceptible to various changes without departing from the scope of the invention.

I claim:

1. A magnetic media for a hard disk drive, comprising:
    a substrate having a plurality of layers of material formed thereon, comprising
    a soft underlayer (SUL), an exchange break layer (EBL), and an oxide layer;
    a partially-oxidized cap layer comprising CoPtCrBTa on the oxide layer, and having an oxidized portion integrated with a non-oxidized cap portion to form a singular, partially-oxidized cap; and
    a carbon overcoat (COC).

2. A magnetic media according to claim 1, wherein the partially-oxidized cap layer comprises a Cr alloy, the EBL comprises a template layer of NiWCr and an Ru layer, the oxide layer comprises at least one oxide layer, and the oxidized portion is located below the non-oxidized cap portion.

3. A magnetic media according to claim 1, further comprising a second cap layer on the partially-oxidized cap layer beneath the COC.

4. A magnetic media according to claim 1, wherein the partially-oxidized cap layer comprises Cr at about 18-24 at %, Pt at about 13-20 at %, B at about 4-10 at %, and Ta at greater than 0 to about 2 at %.

5. A magnetic media according to claim 1, wherein the partially-oxidized cap layer comprises Cr at about 19-21 at %, Pt at about 17-20 at %, B at about 6-8 at %, and Ta at greater than 0 to about 1 at %.

6. A magnetic media according to claim 1, wherein the non-oxidized cap portion of the partially-oxidized cap layer is sputtered without oxygen and has a saturation magnetization (Ms) value of less than about 300 emu/cc, and the Ms value is about 400-500 emu/cc for the oxidized portion.

7. A magnetic media according to claim 6, wherein the oxidized portion has an Ms value that is about 1.5-2 times greater than that of the non-oxidized cap portion.

8. A magnetic media according to claim 1, wherein the oxidized portion of the partially-oxidized cap layer has a thickness of about 0.5-2.5 nm thick, and the non-oxidized cap portion of the partially-oxidized cap layer has a thickness of about 0.5-5 nm.

9. A magnetic media according to claim 1, wherein the oxidized portion of the partially-oxidized cap layer has a thickness of about 1-2 nm thick, and the non-oxidized cap portion of the partially-oxidized cap layer has a thickness of about 3-4 nm.

10. A magnetic media according to claim 1, wherein the oxidized and non-oxidized cap portions of the partially-oxidized cap layer are sputtered from a same target and have a same composition of metallic elements.

11. A magnetic media according to claim 1, wherein the non-oxidized cap portion has an Ms value of about 250 emu/cc and, after the non-oxidized cap portion is oxidized, the Ms value is about 450 emu/cc.

12. A magnetic media according to claim 3, wherein the second cap layer has a thickness of about 1 nm.

13. A magnetic media according to claim 1, wherein the magnetic media is perpendicular magnetic recording media.

14. A hard disk drive, comprising:
    a disk with perpendicular magnetic recording media for recording data, the disk being substantially planar and having a rotational axis;
    an actuator having a magnetic read head and movable relative to the disk for reading data recorded on the disk;
    the disk further comprising:
    a substrate having a plurality of layers of material formed thereon, comprising
    a soft underlayer (SUL), an exchange break layer (EBL), and an oxide layer;
    a partially-oxidized cap layer comprising CoPtCrBTa on the oxide layer, and having an oxidized portion integrated with a non-oxidized cap portion to form a singular, partially-oxidized cap; and
    a carbon overcoat (COC).

15. A hard disk drive according to claim 14, wherein the partially-oxidized cap layer comprises a Cr alloy, the EBL comprises a template layer of NiWCr and an Ru layer, the oxide layer comprises at least one oxide layer, and the oxidized portion is located below the non-oxidized cap portion.

16. A hard disk drive according to claim 14, further comprising a second cap layer on the partially-oxidized cap layer beneath the COC.

17. A hard disk drive according to claim 14, wherein the partially-oxidized cap layer comprises Cr at about 18-24 at %, Pt at about 13-20 at %, B at about 4-10 at %, and Ta at greater than 0 to about 2 at %.

18. A hard disk drive according to claim 14, wherein the partially-oxidized cap layer comprises Cr at about 19-21 at %, Pt at about 17-20 at %, B at about 6-8 at %, and Ta at greater than 0 to about 1 at %.

19. A hard disk drive according to claim 14, wherein the non-oxidized cap portion of the partially-oxidized cap layer is sputtered without oxygen and has a saturation magnetization (Ms) value of less than about 300 emu/cc, the Ms value is about 400-500 emu/cc for the oxidized portion.

20. A hard disk drive according to claim 14, wherein the oxidized portion of the partially-oxidized cap layer has a thickness of about 0.5-2.5 nm thick, and the non-oxidized cap portion of the partially-oxidized cap layer has a thickness of about 0.5-5 nm.

21. A hard disk drive according to claim 14, wherein the oxidized portion of the partially-oxidized cap layer has a thickness of about 1-2 nm thick, and the non-oxidized cap portion of the partially-oxidized cap layer has a thickness of about 3-4 nm.

22. A magnetic media according to claim 16, wherein the non-oxidized cap portion has an Ms value of about 250 emu/cc and, after the non-oxidized cap portion is oxidized, the Ms value is about 450 emu/cc, and the second cap layer has a thickness of about 1 nm.

23. A method of fabricating magnetic media for a hard disk drive, comprising:
  (a) providing a substrate;
  (b) forming a plurality of layers on the substrate comprising a soft underlayer (SUL), an exchange break layer, and an oxide layer;
  (c) forming a partially-oxidized cap layer comprising CoPtCrBTa and having an oxidized portion integrated with a non-oxidized cap portion to form a singular, partially-oxidized cap; and
  (d) forming a carbon overcoat (COC) on the partially-oxidized cap layer.

24. A method according to claim 23, wherein step (c) comprises flowing a mixture of argon and oxygen without sputtering to uniformly distribute oxygen and form the oxidized portion; after a delay, starting deposition; after another delay, terminating the flow of oxygen to complete the non-oxidized cap portion.

25. A method according to claim 23, wherein step (c) comprises initially flowing inert gas and oxygen to grow the oxidized portion, stopping oxygen flow in a middle of film growth of the partially-oxidized cap layer, and continuing media deposition to complete the non-oxidized cap portion; and further comprising forming a second cap layer on the partially-oxidized cap layer at a thickness of about 1 nm with $CoPt_{18}Cr_{13}B_7$, and 40 sccm of argon gas.

26. A hard disk drive, comprising:
  a disk with perpendicular magnetic recording media for recording data, the disk being substantially planar and having a rotational axis;
  an actuator having a magnetic read head and movable relative to the disk for reading data recorded on the disk; the disk further comprising:
  a substrate having a plurality of layers of material formed thereon, comprising
  a soft underlayer (SUL), an exchange break layer (EBL), and an oxide layer;
  a partially-oxidized cap layer on the oxide layer, comprising an oxidized portion integrated with a non-oxidized cap portion to form a singular, partially-oxidized cap; and
  a carbon overcoat (COC); and
  the non-oxidized cap portion of the partially-oxidized cap layer is sputtered without oxygen and has a saturation magnetization (Ms) value of less than about 300 emu/cc, the Ms value is about 400-500 emu/cc for the oxidized portion.

27. A hard disk drive according to claim 26, wherein the oxidized portion of the partially-oxidized cap layer has a thickness of about 0.5-2.5 nm thick, and the non-oxidized cap portion of the partially-oxidized cap layer has a thickness of about 0.5-5 nm.

28. A magnetic media according to claim 26, wherein the partially-oxidized cap layer comprises $CoPt_{18}Cr_{20}B_6$, the non-oxidized cap portion has an Ms value of about 250 emu/cc and, after the non-oxidized cap portion is oxidized, the Ms value is about 450 emu/cc, and having a second cap layer having a thickness of about 1 nm.

* * * * *